E. K. BAKER.
VEHICLE WHEEL.
APPLICATION FILED AUG. 3, 1914.
1,123,065.
Patented Dec. 29, 1914.
2 SHEETS—SHEET 1.
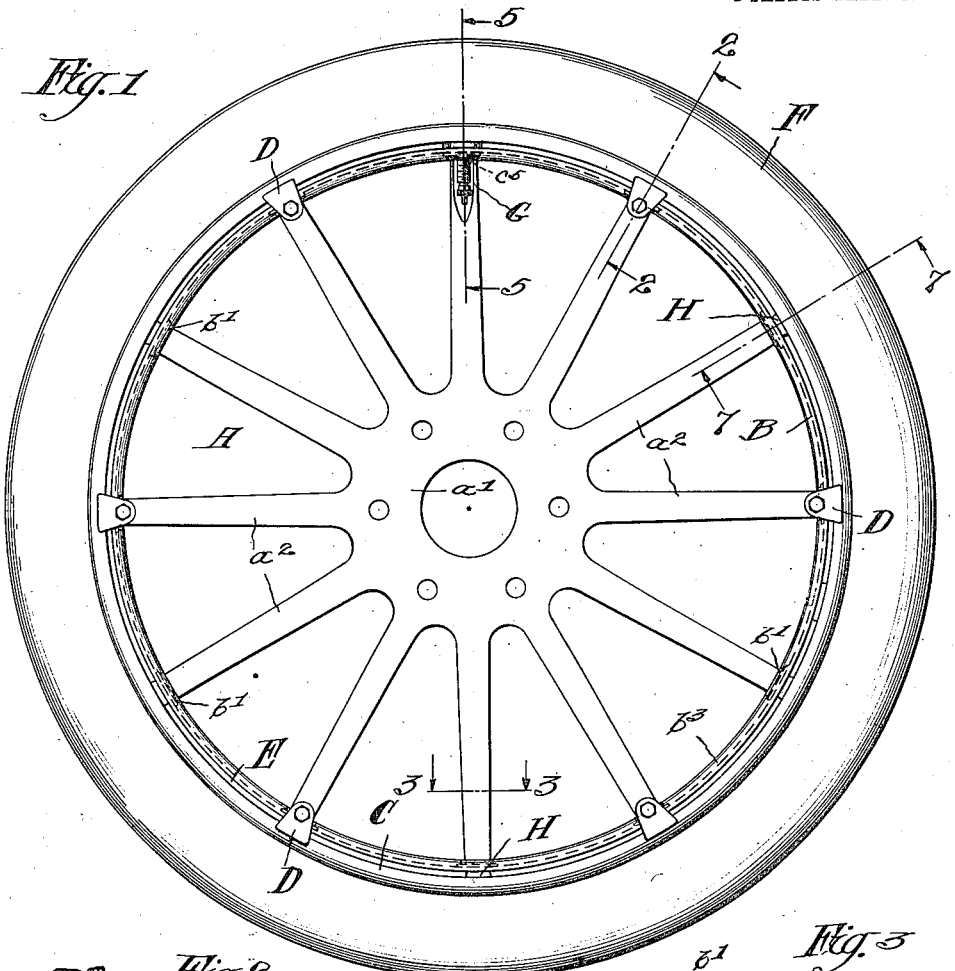
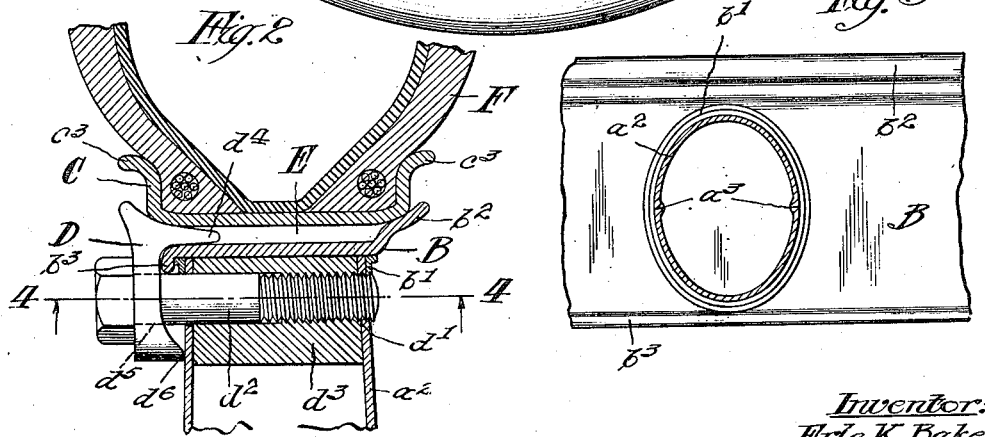
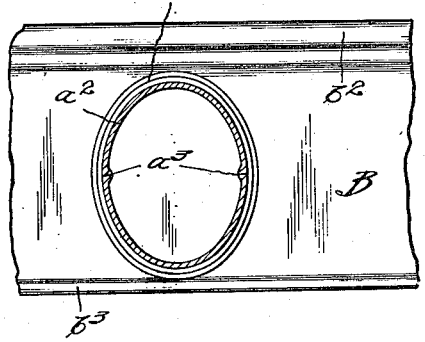
Witnesses:
Carl E. Howe
Edward F. Wilson
Inventor:
Erie K. Baker

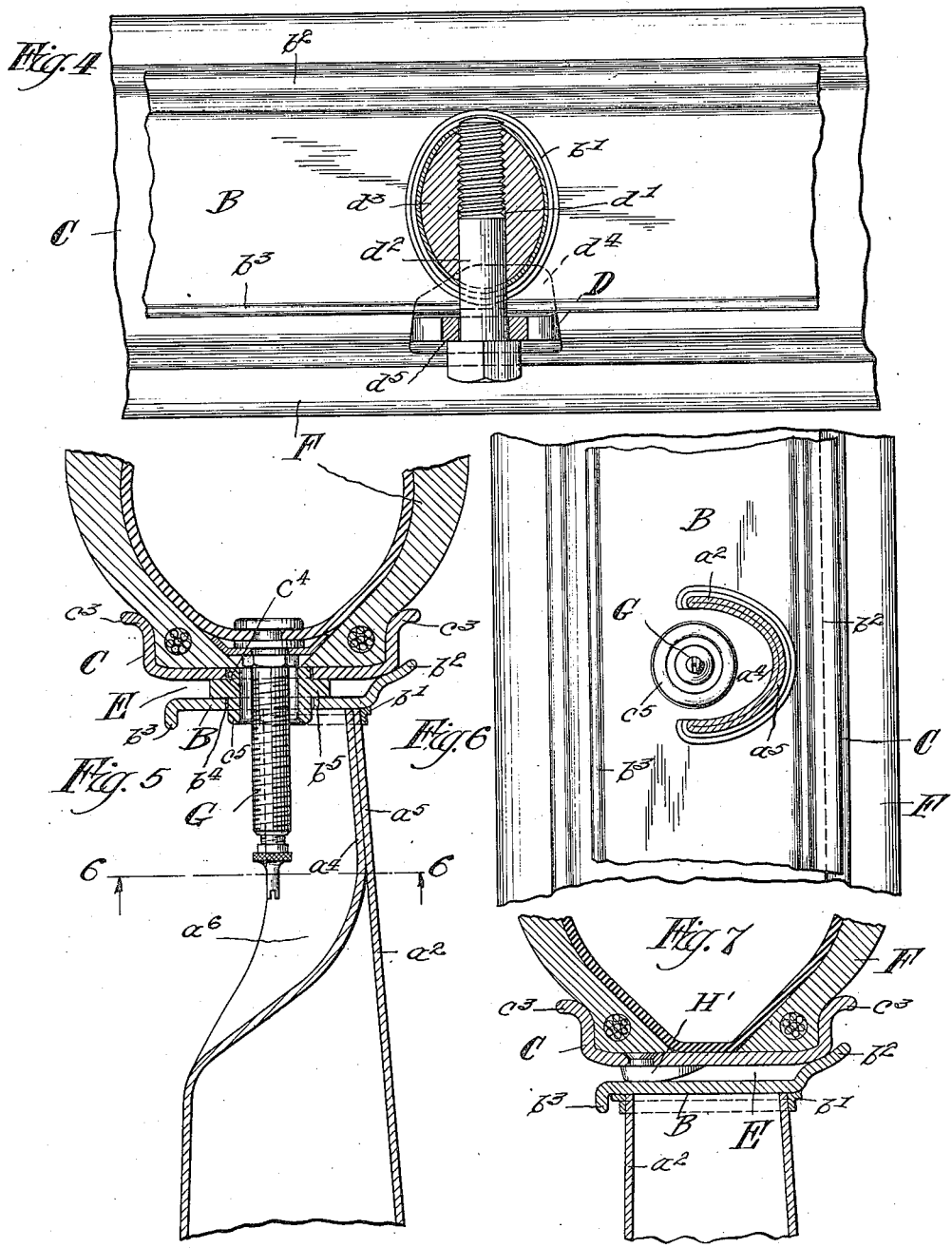

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

VEHICLE-WHEEL.

1,123,065.

Specification of Letters Patent.

Patented Dec. 29, 1914.

Application filed August 3, 1914. Serial No. 854,791.

*To all whom it may concern:*

Be it known that I, ERLE K. BAKER, a citizen of the United States, and a resident of Chicago, county of Cook, and State of Illinois, have invented certain new and useful Improvements in Vehicle-Wheels, of which the following is a specification.

My invention relates to improvements in vehicle wheels, and has particular reference to improvements in metallic wheels of the demountable bolted-on rim type.

The object of my invention is to provide a metallic vehicle wheel construction adapted for use with bolted-on demountable rims, which shall be simple in construction, easy to manufacture, strong and durable; which shall consist of but few parts, and which shall be light in weight, and which can be manufactured at low cost.

My invention resides in an automobile wheel of the demountable rim type having hollow metallic spokes, some of which are provided with holes to receive rim-clamping bolts, and a continuous fixed rim welded or otherwise secured to and upon the outer ends of the spokes.

My invention further consists in a metallic wheel having thin-walled metallic spokes, the outer ends of the spokes being metallically reinforced, a fixed rim welded or otherwise permanently joined to and made one with the spokes and some of the spokes being provided with transverse holes adapted to receive rim-fastening bolts.

My invention further consists in a metallic vehicle wheel having thin-walled tubular spokes, the outer ends of some of the spokes being strengthened by internal reinforcements, and provided with holes extending transversely through the spokes and reinforcements and adapted to receive rim-fastening bolts, and a fixed rim metallically and permanently connected and joined to and with the outer ends of all of the spokes and provided at one side with a tire-rim abutment.

My invention also consists in the several arrangements and combinations of structures and parts, whereby the above mentioned and other objects are attained, and all as hereinafter described and particularly pointed out in the appended claims.

My invention will be more readily understood by reference to the accompanying drawings, forming part of this specification, and in which:

Figure 1 is a side elevation of an automobile wheel constructed in accordance with my invention; Fig. 2 is an enlarged radial section on the line 2—2 of Fig. 1; Fig. 3 is a transverse section of one of the spokes on the line 3—3 of Fig. 1 looking toward the rim; Fig. 4 is a transverse section on the line 4—4 of Fig. 2 looking toward the rim; Fig. 5 is an enlarged radial section through the valve on the line 5—5 of Fig. 1; Fig. 6 is a transverse section on the line 6—6 of Fig. 5; and Fig. 7 is a transverse section on the line 7—7 of Fig. 1.

The form of metallic wheels which I have illustrated has a hollow metallic hub from which radiates a plurality of hollow metallic spokes. To complete the wheel proper, I provide a fixed rim which extends around the outer ends of the spokes, and is seated substantially centrally thereon, and I join the outer ends of the spokes to this fixed rim preferably by welding the ends of the spokes solidly and permanently to the fixed rim.

For the purpose of increasing the strength of the joint between the ends of the spokes and the rim, I reinforce each of the spokes either by means of an outwardly formed or extending flange or by an interior filling or plug or by both. Preferably these reinforcements contact with the inner surface of the fixed rim and provide additional contacting or jointing surface between the rim and the spokes as well as thicken, reinforce and strengthen the outer ends of the spokes.

Preferably I provide the fixed rim with a rim receiving flange at one side, adapted to serve as a bearing or abutment for the demountable rim and with an inwardly extending flange at its other edge, and I proportion the sizes or dimensions of the demountable rim and the fixed rim so that when the demountable rim is placed upon the wheel there is provided between the demountable rim and the fixed rim a circumferential slot or space adapted to receive the inner ends of wedge lugs for securing and holding the demountable rim upon the fixed rim of the wheel. For securing the wedge lugs in position, I provide bolt holes in the outer ends of some of the spokes, preferably each alternate spoke, to receive the bolts which secure the lugs.

In the form of my invention illustrated in the drawings, I make the outer end of each alternate spoke solid, that is, I fill the outer end of each alternate spoke and in each such filled or solid end I produce or provide a threaded bolt hole to receive the clamping bolt. For the purpose of supporting the demountable rim between the wedge lugs I provide lugs or studs in the circumferential slot between the two rims and spaced so as to support the demountable rim immediately over the spokes which do not carry clamping bolts. This construction results in an exceedingly strong and durable metallic wheel which is as light in weight as is consistent with the strains to which the wheel is subject in use, and in which the metal used is distributed in such a manner as to provide a wheel of maximum strength and minimum weight. In order to make the wheel and its fastenings symmetrical, I provide a space for receiving the valve of the tire in one of the alternate spokes, that is, in one of the spokes between two of the wedge lugs, and for this purpose I deform the outer end of the spoke, forcing the forward wall, at the outer end of the spoke, back into contact with the rear wall, thus providing a groove in the outer face of the spoke of such dimensions that the valve of the tire can be properly operated.

The wheel, as illustrated in the drawings, comprises a central portion A, comprising the hub $a^1$, and radial spokes $a^2$. This central portion may, as illustrated, be formed and made up of front and rear parts formed of sheet metal, and joined together by welding upon a medial plane, as indicated at $a^3$, Fig. 3, the essential feature of this construction being that the spokes $a^2$ are hollow and preferably, as shown are thin-walled. I complete the wheel proper by means of a fixed rim B, which is continuous, and which fits upon the outer ends of the spokes. I join this rim to the spokes, preferably by welding, and in order to increase the strength of the joint between the end of each spoke and the rim B, I provide a circumferential flange $b^1$ surrounding the outer end of each spoke. While the flange $b^1$ may be formed in many ways, I preferably provide an angle ring of a size to fit snugly upon the outer end of the spoke and arranged with one flange formed to contact with the inner surface of the rim B. This flange $b^1$ is made integral with the end of the spoke and the fixed rim, preferably by welding. I provide the fixed rim B at one side or edge with a circumferential flange $b^2$ for the purpose of providing the wheel with a rim seat to receive and support the demountable rim C. I prefer that the fixed rim shall be strengthened at its outer edge, as by an inwardly turned flange $b^3$. The fixed rim, as thus constructed, though made of relatively thin metal, is stronger and more rigid than if it were much thicker and formed without the flanges. The demountable rim preferred, has integral flanges $c^3$, $c^3$ here shown shaped to receive a straight side pneumatic tire F, as contrasted with a clencher tire.

I make the fixed rim B smaller in diameter than the demountable rim C to provide a circumferential slot or space E adapted to receive the wedging toes or points of the wedge clamps D. The flange $b^2$ forms a rim abutment at one side of the fixed rim B, and in order to hold the rim C against this rim abutment, I provide a number of wedging rim clamps D spaced about the fixed rim B. For the purpose of holding these wedging rim clamps in position and retaining the rim C upon the wheel, I provide the outer ends of some of the spokes with transverse bolt holes $d^1$ adapted to receive the rim-clamping bolts $d^2$. Preferably I arrange these rim clamps upon alternate spokes. In the form shown I arrange six of these clamps around the wheel, the wheel itself being provided with twelve spokes. In order to strengthen the spokes which carry the clamping bolts and to provide the bolt-receiving holes $d^1$, I preferably reinforce the outer ends of these spokes with metal plugs $d^3$ welding them solidly in place and to the fixed rim B. This construction also strengthens the joint between the several spokes and the fixed rim B, and makes the spokes substantially integral with the fixed rim. Preferably I adapt the holes $d^1$ in the solid ends of the spokes to receive the threaded ends of the clamping bolts $d^2$. Each of the clamps D is provided with a wedging point $d^4$ which enters the space E, and each has in its shank a central hole or opening $d^5$ to receive the bolt $d^2$, and I provide the inner end of each said shank with a heel or projection $d^6$ adapted to contact with the adjacent surface of the spoke when the clamp is in rim-securing position, as shown in Fig. 2. As shown, I make the filling or plug $d^3$ of such length that the inner end thereof supports the wall of the spoke immediately beneath the heel $d^6$ and thus prevents the distortion of the spoke at that point. To provide a driver or driving connection between the demountable rim C and the wheel, I employ, as shown in Fig. 5, a fixed inwardly extending projection $c^4$ on the rim C the same having a reduced end $c^5$ which fits within an opening $b^4$ in the fixed rim B and thereby dowel the rim and wheel together. I preferably form this driver to serve as a spacer or support for the rim C, and for this purpose I make the driver with a flange $b^5$ equal in thickness to the radial depth of the space E between the two rims. Preferably, as shown, I arrange the driver midway between two of the wedge lugs D and, as shown, I may provide the driver with a central radial opening to accommodate the valve stem G.

It is desirable to make the wheel and demountable rim as a whole symmetrical, with the valve in alinement with one of the spokes. When I arrange the valve G midway between two of the wedge lugs and extending radially in alinement with one of the spokes, I form that spoke to accommodate the valve and permit easy access to it when necessary. For this purpose I deform the outer end of the spoke which is in line with the valve, depressing or forming the outer wall $a^4$ of this spoke rearwardly and substantially into contact with the rear wall $a^5$ thereof, as clearly shown in Figs. 5 and 6. This construction provides a groove or depression $a^6$ in the outer end of this spoke which exposes the valve G, and allows free access thereto. I sometimes employ additional rim supports H for the rim C. These I arrange circumferentially between the clamps D, and preferably in line with the intermediate spokes, and these, in combination with the clamps D, provide a support for the demountable rim in line with each of the several spokes. These supports or studs H may obviously be secured to the fixed rim B, as in Fig. 1. I however prefer to use a demountable rim which carries its own supporting studs, as shown at H' in Fig. 7.

While I have thus illustrated and described my invention, I desire it to be understood that the details of construction may be materially varied, and that various changes, modifications, and substitutions may be made in the wheel herein illustrated without departing from the spirit and scope of my invention as set forth in the appended claims.

Having thus described my invention, I claim as new and desire to secure by Letters Patent:

1. A metallic vehicle wheel comprising a hub, a metallic fixed rim and metallic hollow spokes extending from the hub to the rim, the outer ends of the spokes being welded to and with the rim, some of the spokes being provided with transverse holes for receiving demountable rim-clamping bolts, and the fixed rim being provided with means at one side to support a demountable rim.

2. In a metallic wheel having hollow metallic spokes, a metallic fixed rim welded to the ends of all of the spokes, some of the spokes being reinforced at their outer ends and provided with transverse openings adapted to receive rim clamping bolts.

3. In a metallic wheel, hollow, thin-walled radial spokes, a continuous fixed rim integrally joined to and with the outer ends of the spokes, alternate spokes being filled at their outer ends and provided through said fillings with transverse openings adapted to receive rim-clamping bolts and said fixed rim being provided at one side with a demountable-rim abutment.

4. In a metallic wheel of the bolted-on demountable rim type a metallic hub and a fixed rim, hollow spokes connecting the rim and hub, the spokes being reinforced at their outer ends by means of circumferential outwardly extending flanges, and alternate spokes being also internally reinforced at their outer ends and provided with transverse openings for rim-clamping bolts and extending through said internal reinforcements.

5. In a metallic vehicle wheel, hollow thin-walled radial spokes, a fixed rim surrounding the outer ends of said spokes and integrally connected therewith, the outer end of each alternate spoke being filled with a plug integrally joining the rim and spoke, and said alternate spokes being provided in their outer solid ends with transverse threaded openings adapted to receive bolts for clamping a demountable rim upon the wheel, said fixed rim being provided with a rim-receiving abutment at one side.

6. In a metallic wheel of the bolted-on demountable rim type, a metallic wheel proper having thin-walled hollow spokes, and a fixed rim welded to and upon the outer ends of the spokes, each of said spokes having an outwardly extending circumferential flange at its outer end strengthening the spoke and the joint between the spoke and fixed rim and some of said spokes having transverse holes at their outer ends for receiving rim-clamping bolts.

7. In a metallic wheel of the bolted-on demountable rim type, a metallic wheel proper having thin-walled hollow spokes, and a flanged fixed rim welded to and upon the outer ends of the spokes, each of said spokes having an outwardly extending circumferential flange at its outer end strengthening the spoke and the joint between the spoke and fixed rim, and some of said spokes having threaded bolt holes at their outer ends for receiving rim-clamping bolts.

8. An automobile wheel comprising a metallic wheel proper having hollow spokes, and a metallic fixed rim upon the outer ends of the spokes and welded thereto, each alternate spoke being provided with a transverse opening adapted to receive a rim-clamping bolt, said fixed rim being provided at one side with a demountable rim abutment, a demountable rim seated on said abutment and of an inner diameter providing a circumferential slot between the fixed rim and demountable rim, wedge lugs arranged between the two rims and held in position by bolts in said bolt holes, and rim-supporting projections arranged between the demountable rim and the fixed rim and supporting the demountable rim at points adjacent to the outer ends of the alternate spokes.

9. In a vehicle wheel of the bolted-on demountable rim type adapted to receive a pneumatic tire, hollow spokes in combination with a continuous fixed rim welded to the ends of the spokes, alternate spokes having transverse bolt holes for receiving rim-clamping bolts, and one of the intermediate spokes being deformed at its outer end to provide a radially extending groove for accommodating and permitting access to the valve stem of a pneumatic tire.

10. A rim of the herein described bolted-on type, in combination with a complementary metallic wheel comprising tubular spokes, a relatively thin metallic fixed rim metallically united with and to the ends of all of the spokes, wedging rim clamps secured upon the outer ends of some of the spokes, and a rim support or stud in substantial alinement with each of the other spokes.

11. A rim of the herein-described bolted-on type, in combination with a metallic wheel having tubular spokes and a continuous welded-on fixed rim, a circumferential space being provided between the rim and fixed rim, and rim supports in said space one in alinement with each said spoke.

12. In a metallic wheel of the herein described bolted-on rim type, a wheel proper having tubular spokes and a metallic fixed rim metallically united with and to the ends of the spokes, in combination with a demountable rim, means for clamping the rim upon the wheel, a dowel carried by the demountable rim, and the fixed rim being provided with a complementary hole in alinement with one of the spokes for receiving the dowel, and circumferentially locking the rim upon the wheel.

13. In a metallic wheel of the herein described bolted-on rim type, a wheel proper having tubular spokes and a fixed rim metallically united with and to the ends of the spokes, in combination with a demountable rim, wedging rim clamps carried by the wheel, one on each alternate spoke, for clamping the rim upon the wheel, a dowel carried by the demountable rim and the fixed rim being provided with a complementary hole in alinement with one of the spokes to receive the dowel and circumferentially lock the rim to the wheel.

14. In a metallic wheel of the herein described bolted-on rim type, a wheel proper having tubular spokes, and a fixed rim welded to the ends of said spokes, alternate spokes being provided with transverse holes for receiving rim-clamping bolts, one of the intermediate spokes being deformed at its outer end to provide a valve stem receiving groove, the fixed rim being provided with a dowel hole in alinement with said spoke, a demountable rim on said wheel, a dowel projecting from the inner face of the demountable rim, and entering said dowel hole, and said dowel being provided with a valve stem hole.

In testimony whereof, I have hereunto set my hand, this 25th day of July, 1914, in the presence of two subscribing witnesses.

ERLE K. BAKER.

Witnesses:
 EDWARD F. WILSON,
 JOHN R. LEFEVRE.